UNITED STATES PATENT OFFICE.

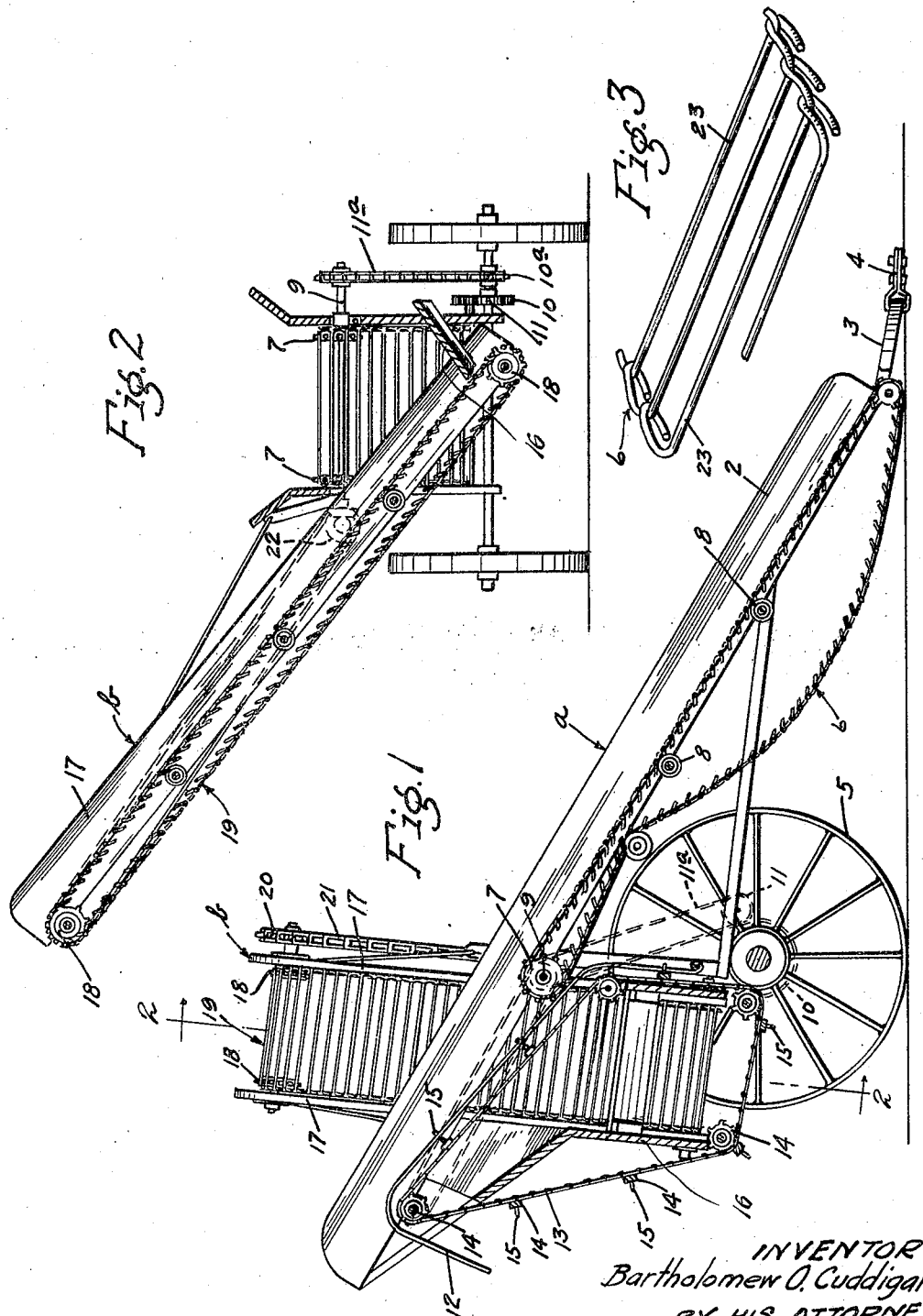

BARTHOLOMEW O. CUDDIGAN, OF WADENA, MINNESOTA, ASSIGNOR, BY DIRECT AND MESNE ASSIGNMENTS, TO THE CUDDIGAN-GEHR MANUFACTURING COMPANY, OF WADENA, MINNESOTA, A CORPORATION OF MINNESOTA.

POTATO LOADER.

1,405,297.        Specification of Letters Patent.      Patented Jan. 31, 1922.

Application filed December 31, 1920. Serial No. 434,297.

*To all whom it may concern:*

Be it known that I, BARTHOLOMEW O. CUDDIGAN, a citizen of the United States, residing at Wadena, in the county of Wadena and State of Minnesota, have invented certain new and useful Improvements in Potato Loaders; and I do hereby declare the following to be a full, clear, and exact description of the invention, such as will enable others skilled in the art to which it appertains to make and use the same.

This invention relates to a potato loader, particularly to that type of loader by means of which the potatoes are raised from the ground and separated from the vines and other material, and elevated to a suitable position to be loaded into a wagon or other receptacle.

It is an object of this invention to provide such a loader which comprises a simple and efficient elevating and separating means for the potatoes, vines and refuse.

It is another object of the invention to provide such a loader with few elevating parts, which parts are operating with the minimum of mechanism.

These and other objects and advantages of the invention will be apparent from the following description made in connection with the accompanying drawings in which like reference characters refer to the same parts throughout the different views, and in which:

Fig. 1 is a sectional view of a loading device, the section being taken through the primary elevator, which elevates the potatoes from the ground;

Fig. 2 is a section taken on the line 2—2 of Fig. 1 looking in the direction of the arrows;

Fig. 3 is a perspective view showing on a large scale the elevating chain.

The present invention is an improvement upon the potato loader disclosed and claimed in my prior Patent #1273040 of date July 16, 1918.

Referring to the drawings:

The loader of the present invention is seen to comprise a primary elevator designated as *a* and the second elevation mechanism designated as *b*. The first elevating mechanism comprises a trough having sides 2, the lower end of which rests upon or in proximity to the ground and is provided with a pointed bale member 3 in the end of which is secured an attaching means 4, by means of which the loader can be attached to a suitable digger or traction element to be moved and operated. The elevating mechanisms are supported upon a suitable frame which is in turn supported upon the truck wheels 5. The elevator mechanism 1 also comprises an endless chain 6 which is driven by sprocket wheels 7 located intermediate the ends of the trough formed by members 2 and which runs over smaller sprockets secured to the lower end of this trough. The chain 6 is supported between the said sprockets by a plurality of roller supporting members 8 attached to the members 2. The chain 6 is so disposed upon the said sprockets and the intermediate supporting members 8, that it travels in a substantially straight line near the lower edges of the members 2 and thus forms the bottom of the trough formed by these members. The sprocket 7 is mounted upon a shaft 9 extending transversely of the trough 2 and carried in suitable brackets mounted thereon (not shown). A spur gear 10 shown in Fig. 2 and indicated by dotted lines in Fig. 1 is secured to the axle of the trucks 5 and meshes with a smaller spur gear 11 carried on a shaft mounted in suitable carrying brackets on the frame, which gear is also indicated by dotted lines in Fig. 1. A sprocket 10ª is mounted adjacent the gear 11 and by means of a chain 11ª also indicated in dotted lines in Fig. 1, drives the sprocket attached to the shaft 9.

A plurality of spaced rods 12 extend upwardly from the frame member adjacent the sprocket 7 and are then bent at substantially right angles to extend upwardly to extend along below the members 2 and are then bent to extend downwardly near the upper end of the trough formed by members 2. A chain member 13 traveling over the sprockets 14 has its upper run passing a short distance below the rods 12, and this chain is provided with cross members 14 from which project pins 15. When the cross members traverse the upper run of the chain 13, these cross members travel below the bars 12 and the pins 15 project upwardly between said rods. The chain 13 is driven by a sprocket (not shown) carried by shaft 9 and from which a chain indicated in dotted lines in Fig. 1 extends to and over a sprocket attached to the shaft carrying the upper sprocket 14.

Immediately above the sprocket 7 a chute 16 extends transversely beneath the members 2, the bottom portions of which slope downwardly toward the conveyor $b$. The conveyor $b$ extends upwardly transversely of conveyor $a$ and its lower end projects beneath conveyor $a$ and the chute 16 to receive the material discharged from said chute. The conveyor $b$ comprises spaced side members 17 and chain 19 similar to the chain 6 which passes over sprockets 18 at the upper and lower ends of the members 17 and over intermediate supporting rollers mounted upon shafts extending transversely of the members 17. Chain 19 is disposed with its upper run in a substantially straight line and near the bottom edges of side member 17, thus forming the bottom of a trough formed by these members. The chain 19 is driven by a sprocket 20 secured to the end of a shaft which carries the upper sprockets 18, which sprocket 20 is driven by a chain 21 which runs over a sprocket 22. The sprocket 22 is secured to a shaft carried by the frame which is driven by a bevel gear, the mating gear of which is secured to the end of shaft 9. The specific driving mechanism for the parts forms no part of the present invention and the same have not been shown in detail, enough merely being shown to clearly illustrate how the various moving parts are driven.

In operation the loading device will be drawn along on the ground and the various chains and elevating mechanism will be driven by the described connections. The potatoes, vines and such dirt and refuse as adheres thereto will be carried up by chains 6 and elevator $a$. The dirt and potatoes too small to be gathered will drop through the bars of the chain. The larger potatoes and vines will be carried up to the end of chain 6. As the chain runs over the sprocket 7, the potatoes will be discharged into the chute 16. The vines will be unable to pass between the bars 12 and will be carried upwardly along by the slats 14 and pins 15 and will be discharged from the upper end of conveyor or elevator $a$. The potatoes dropping into the chute 16 will be discharged onto the elevator $b$ and will be carried upwardly by the chain 19 therein and discharged in the upper end thereof into a wagon or other receptacle which will be in proper position to receive them.

From the above description, it is seen that the applicant has produced a loader of few and simple parts, which parts are of such construction that they can be cheaply and easily made. The elevating chains comprising the bars 23 have been found to be exceedingly efficient in actual use and to form a greatly improved elevating means for the potatoes and vines. Such an elevating means also cooperates efficiently with the elevating means comprising the members 14 and 15 to form a potato elevator and separator.

It will, of course, be understood that various changes may be made in the form, details and proportions of the device without departing from the scope of the applicant's invention, which generally stated consists in the matter shown and described and set forth in the appended claims.

What is claimed is:

1. A potato loader comprising an elevator and separator having upwardly extending spaced side members, a chain member comprising transversely extending spaced bars adapted to carry potatoes moving between the said side members from the lower end thereof through the greater portion of their length, and a second elevating means comprising longitudinal spaced bars and transverse relatively widely spaced pin-carrying bars movable beneath said bars with said pins projecting upwardly therebetween from the upper end of said chain member to the upper end of said side members.

2. A potato loader having in combination a truck supporting frame spaced upwardly, extending side members carried by said frame, the lower ends of which are adapted to rest on the ground, elevating means extending from the lower end of said side members upwardly throughout the greater extent of the length thereof comprising spaced parallel bars extending between said side members adapted to carry potatoes, a second elevating means comprising spaced longitudinal bars having straight intermediate and downwardly curved ends and extending upwardly beyond said elevating means and having their lower ends disposed beneath the upper end thereof, and chain-carried widely spaced bars extending transversely between said side members, said bars moving from the upper end of said chain member to substantially the upper end of said side members and a chute disposed beneath said side members extending transversely thereof adjacent the upper end of the first mentioned chain.

3. A potato loader comprising an endless conveyor supported to travel upwardly from the ground and comprising spaced members adapted to support the vines and larger potatoes, a second elevating means extending upwardly from the upper end of said conveyor comprising spaced elements adapted to support the vines but through which the potatoes can drop, and a chute dispensed below the upper end of said conveyor, said second elevating means extending beneath the upper end of said endless conveyor and comprising a plurality of spaced inclined upwardly extending bars having downcurved ends, and cross members disposed beneath said bars carrying upwardly projecting pins extending between said bars.

4. A potato loader having in combination a truck, upwardly extending trough forming side members, an upwardly extending endless conveyor disposed between said side members, a plurality of spaced bars extending upwardly between said side members and having their lower ends extending beneath said conveyor and their upper ends bent to extend substantially downwardly a short distance, a conveyor disposed beneath said bars and comprising cross members having pins projecting upwardly between said bars whereby the potatoes will be allowed to fall between the bars but the vines will be carried upwardly therealong.

5. A potato loader having in combination spaced upwardly extended trough-forming side members, an endless conveyor adapted to travel upwardly in said trough to carry the vines and potatoes thereon, supports for said trough forming members adjacent the upper end of said conveyor, a rod extending therebetween, and a plurality of spaced bars rising vertically from said rod and bent to extend under the upper end of said conveyor and upwardly therebeyond between said trough forming members, and an endless conveyor adapted to travel upwardly beneath said bars having cross members thereon, and pins carried thereby projecting upwardly between said bars.

In testimony whereof I affix my signature in presence of two witnesses.

BARTHOLOMEW O. CUDDIGAN.

Witnesses:
J. H. MARK,
AGNES M. NEWMANN.